Figure 1:
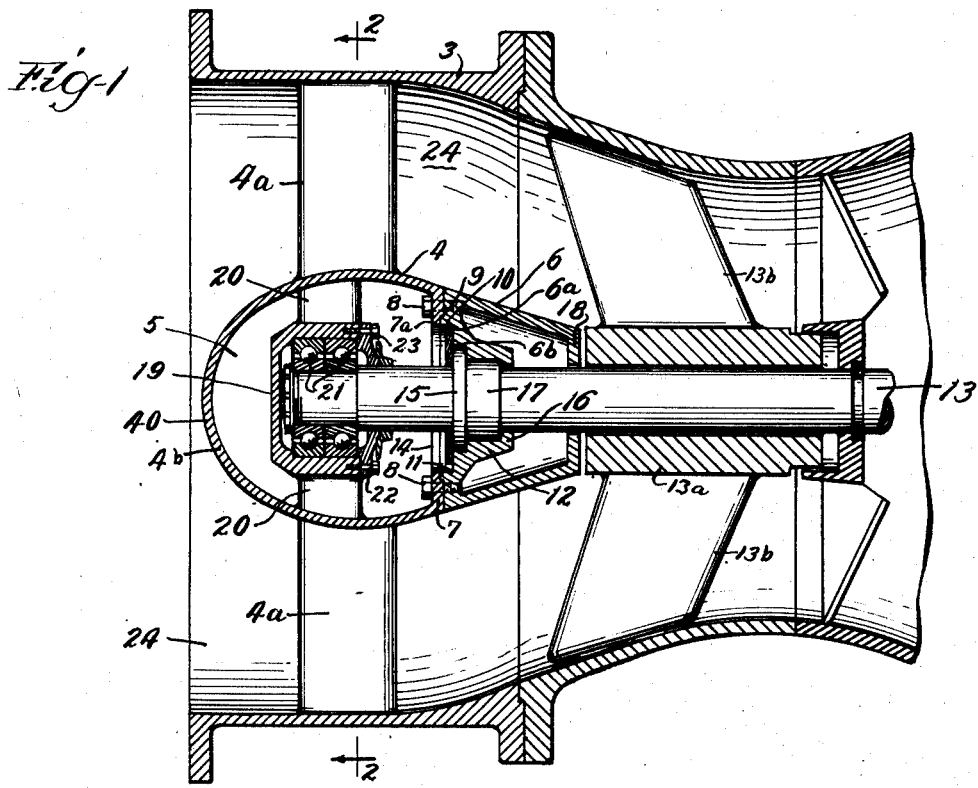

Feb. 6, 1951 — L. G. L. THOMAS — 2,540,968

BEARING STRUCTURE FOR PUMP SHAFTS

Filed Dec. 23, 1948

Inventor
Louis G. L. Thomas
By: Edward W. Weiant
Atty.

Patented Feb. 6, 1951

2,540,968

UNITED STATES PATENT OFFICE 2,540,968

BEARING STRUCTURE FOR PUMP SHAFTS

Louis G. L. Thomas, Hamilton, Ohio, assignor to Hamilton-Thomas Corporation, Hamilton, Ohio, a corporation of Illinois Application December 23, 1948, Serial No. 66,921

9 Claims. (Cl. 308—15)

This invention relates to a bearing structure for pump shafts and the like and concerns itself primarily with means for supporting a pump shaft interiorly of a pipe in sealed relation to the flow of liquid, but nevertheless accessible for inspection of the condition of the seal, the bearing temperature and lubrication.

Heretofore, it has been customary in pump shaft bearings to provide a liquid bearing to protect the shaft bearings. Such liquid bearings usually require a lengthening of the pump structure and they do not last sufficiently long.

It is an object of this invention to overcome such objections in the provision of means extending across the suction pipe of pumps or the like which forms a sealed chamber for the shaft bearings.

The invention comprises the novel structure and combination of parts hereinafter described and more particularly pointed out and defined in the appended claims.

Figure 2:
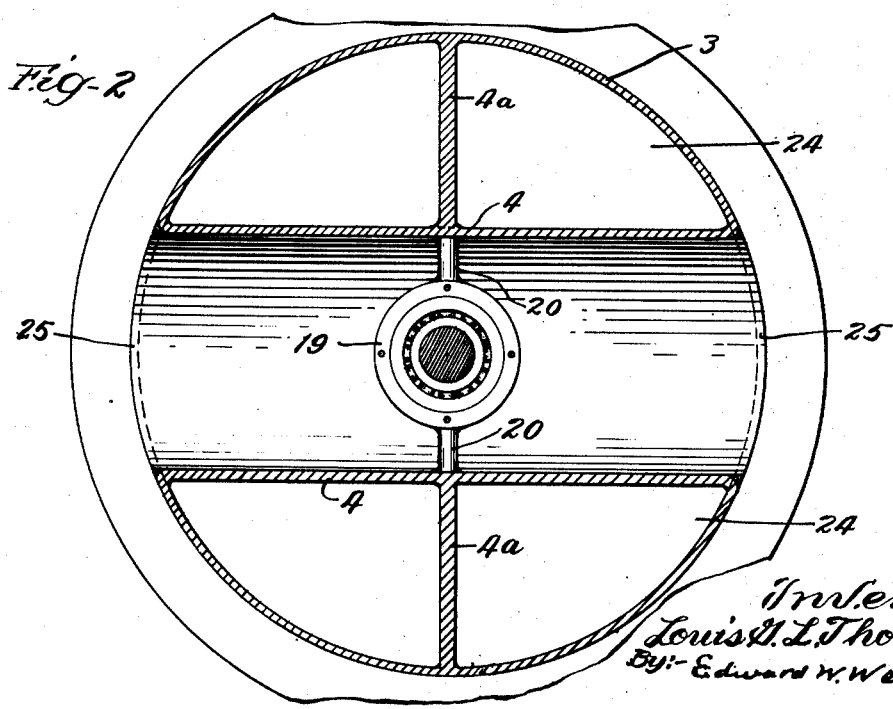

In the accompanying drawing which illustrates a preferred form of this invention and in which similar reference numerals refer to similar features in the different views:

Fig. 1 is a fragmentary longitudinal sectional view through a pump structure illustrating this invention; and Fig. 2 is a transverse sectional view taken substantially upon the line 2—2 of Fig. 1.

In referring now to the drawing, there is shown a portion of the suction pipe 3 of a pump, but it is to be understood that this is only illustrative, as the invention may be used for other apparatus or purposes. A hollow strut 4 extends across the pipe 3. This strut 4 consists of a central chamber 5 and oppositely extending braces 4a which are joined with the pipe 3 and which support the hollow portion thereof in the pipe 3. The rear end of the hollow portion of the strut is closed by an integral curved wall 4b while the front end is closed by a removable circular casting or fitting 6 which abuts an inwardly directed circular flange 7 on the front end of the hollow strut and to which it is secured by screw bolts 8. It will be noted that the front face of the flange 7 has a rabbet 9 in which a rib 10 on the face of the casting 6 fits.

The casting 6 is hollow and the abutting end has an inwardly directed sleeve 12 which converges to embrace a pump shaft 13 which extends through the casting and into the strut chamber 5 and which carries the pump impeller 13a with blades 13b. The interior surface of the sleeve 12 has right angled shoulders or steps 6a and 6b. The bottom of the stepped portion 6a is in alignment with the inner periphery 7a of the flange 7 whereby a recess is formed for a sealing or packing gland 14 which surrounds the shaft 13 and seals the joint between the strut 4 and the casting 6. A second sealing disk 15 is positioned within the stepped portion 6b and surrounds the shaft 13. The inner edge of the sleeve 6 terminates in an inwardly directed flange 16 and confines a packing 17 under the sleeve and upon the shaft adjacent the disk 15. The rear end of the casting 6 terminates in an inwardly directed flange 18 which embraces the shaft 13. Thus the casting 6 with the sealing disks forms an effective seal for the front end of strut chamber 5.

Centrally of the strut chamber 5, there is a bearing housing 19 supported by integral braces 20 joined with the wall of the chamber 5. The rear end of the shaft 13 is journalled in this housing 19 by means of conventional ball bearings 21. The rear end of the housing is closed by an integral wall while the front end is closed by a closure cap 22 which surrounds the shaft and is secured to the housing by screws 23.

The hollow strut 4 is open for the inspection of the ball bearing as to the temperature and lubrication as shown in Fig. 2. To this end, the walls of the chamber 5 extend to both sides of the pipe 3 and are merged therewith as shown in Fig. 2 forming a pair of water flow conduits 24 adjacent the strut. The walls of the suction pipe 3 are provided with opposite openings 25 between portions of the walls of the strut so as to provide access to the ball bearing 21.

The shaft 13 is adapted to carry vanes or blades in the usual manner. While the invention is primarily adapted for pumps, it is conceivable that it may be applied to other apparatus, the bearings of which require inspection.

It will be appreciated that with this construction, the shaft bearings are housed and sealed in a flow pipe, with provision for inspection from the exterior thereof without the necessity for stopping the operation thereof.

I am aware that many changes may be made and various details of construction may be modified without departing from the principles of this invention so I do not propose limiting the patent granted thereon otherwise than necessitated by the prior art.

I claim:

1. In an apparatus of the class described, a liquid flow pipe having a circular wall, a shaft bearing strut extending across said pipe and having a chamber centrally of the pipe, said chamber having opposed walls joined with the wall of the pipe, said pipe having an opening between such walls for establishing access to said chamber, a bearing between said opposed walls within said chamber, a shaft journalled in said bearing, and means for sealing the shaft end of the said chamber.

2. In an apparatus of the class described, a cylindrical pipe, means for mounting a shaft in said pipe comprising a strut having arms secured to said pipe and opposed walls secured to said pipe and defining a chamber centrally of the pipe, said pipe having an opening between said walls for access to said chamber and a bearing in said chamber between said opposed walls adapted for supporting a shaft.

3. In an apparatus of the class described including a cylindrical pipe, means for supporting a shaft within said pipe comprising a strut extending across said pipe and having terminal arms attached to said pipe and a medial bearing housing, said housing having spaced wall portions extending to the wall of the pipe and being secured thereto, said pipe having an opening between such walls for access to said housing, a bearing supported between said spaced wall portions in said housing adapted for supporting a shaft and means for sealing said housing at the shaft entrance end.

4. In an apparatus of the class described including a cylindrical pipe, means for supporting a shaft within said pipe comprising a bearing housing centrally of the pipe, said housing having spaced walls extending across the pipe and secured thereto, and brace arms at right angles to said walls joined to said pipe, said pipe having an opening between said walls for access to said housing and a shaft bearing mounted in said housing between said spaced walls.

5. In a device of the class described comprising a conduit, means for supporting a shaft within said conduit comprising a housing within said conduit having opposed walls, braces connecting said walls with the wall of said conduit, said opposed walls being joined to the said conduit defining a flow chamber upon each side thereof and said conduit having an opening between said walls for access to said housing and shaft bearing means sealed in said housing between said opposed walls.

6. In a device of the class described including a conduit, a shaft bearing housing supported within said conduit, said housing having spaced wall portions extending to the walls of the conduit and secured thereto, said conduit having an opening between said wall portions for access to said housing and a shaft bearing mounted in said housing between said spaced walls.

7. In a structure of the class described, a fluid flow pipe, a housing within said pipe having its walls extended and secured to said pipe, means for bracing said walls within the pipe, said pipe having an opening between said extended walls for access to said housing, a bearing between said extended walls and a shaft journalled and sealed in said bearing.

8. In a structure of the class described, a fluid flow pipe, a housing within said pipe, said housing having opposed walls extending across the pipe and secured thereto, means for bracing said walls against the adjacent portions of the wall of said pipe, said pipe having openings between said opposed walls for access to the interior of said housing, a bearing in said housing located between said opposed walls, a shaft journalled in said bearing and means for sealing said shaft in said housing.

9. In a structure of the class described, a fluid flow pipe, a bearing housing within said pipe, said housing having opposite walls extended and secured to said pipe, means for bracing said opposite walls, said pipe having an opening between said opposite walls for access into said housing, a bearing in said housing located between said opposite walls, a shaft journalled in said bearing and means for sealing said shaft in said bearing.

LOUIS G. L. THOMAS.

REFERENCES CITED

The following references are of record in the file of this patent:

UNITED STATES PATENTS

| Number | Name | Date |
| --- | --- | --- |
| 1,887,417 | Mawson | Nov. 8, 1932 |
| 2,108,703 | Bentley | Feb. 15, 1938 |
| 2,223,847 | Engdahl | Dec. 3, 1940 |
| 2,414,814 | Johnson | Jan. 28, 1947 |
| 2,439,447 | Buck | Apr. 13, 1948 |